United States Patent Office 3,277,176
Patented Oct. 4, 1966

3,277,176
OXIDATION OF HYDROXY BORINIC ACIDS
TO KETONES AND ALCOHOLS
Tillmon H. Pearson, Baton Rouge, La., assignor to Ethyl
Corporation, New York, N.Y., a corporation of Virginia
No Drawing. Filed Sept. 27, 1963, Ser. No. 312,259
6 Claims. (Cl. 260—593)

This invention relates to a novel and unique process for the production of alcohols and ketones.

It is an object of this invention to provide a process to produce alcohols and ketones. It is a particular object of this invention to provide a process for producing alcohols and ketones which were heretofore difficult to make. Other objects will be apparent from the ensuing description.

The above and other objects are accomplished by the provision of a process for producing alcohols and ketones, which comprises reacting an alpha-hydroxyborinic acid with an oxidizing agent in an aqueous system having a pH of above about 8, at a temperature ranging from about 0° C. to about 200° C. for a time sufficient to produce said alcohols and ketones.

The alpha-hydroxyborinic acid reactants employed in the process of this invention have the general formula

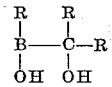

wherein the R groups are the same or different hydrocarbon radicals, each containing up to about 18 carbon atoms. These hydrocarbon radicals may be further defined as alkyl, alkenyl, alkynyl, cycloalkyl, aryl, alkaryl, and aralkyl groups. It is preferred that the R groups of the alpha-hydroxyborinic acid be alkyl groups, each having up to about 18 carbon atoms. These compositions are preferred since they are easier to obtain in high yield of purity and represent a rather economical reactant.

The oxidizing agent employed in the process of this invention can be any oxidizing agent generally known in the art. Hence, one may employ air, hydrogen peroxide, oxygen, metal peroxides and the like in this process. It is preferable, however, to employ hydrogen peroxide since excellent yields are obtained, and the reactant is easier to handle and to meter into the reaction vessel.

The amount of oxidizing agent employed generally varies over an extremely broad range. However, it is generally acceptable to employ the oxidizing agent in at least such an amount that one atom of oxygen will be present in the reaction system for every boron to carbon bond of the alpha-hydroxyborinic acid reactant. It is generally preferable in the process of this invention to employ the oxidizing agent in a slight excess such that from about an average of one and one-half atoms of oxygen to about 3 atoms of oxygen per boron to carbon bond will be present in the reaction system. When the preferred range is employed excellent results are obtained, giving high purity alcohols and ketones in good yields.

The process of this invention is conducted in an aqueous system generally having a pH of above about 8. It is most preferable that the process be conducted in an aqueous system having a pH of above about 9. Excellent results, such as high yields, are experienced when systems having the preferred pH are employed.

It is therefore desirable to employ in the process of this invention basic materials such as alkali metal hydroxides, alkaline earth metal hydroxides and other metal hydroxides. Of the hydroxides, it is preferred that the alkali metal hydroxides be employed since these are cheap and easily obtained. It is particularly preferred that sodium hydroxide be employed both from a standpoint of good results and economy.

The alcohols and ketones produced by the process of this invention are directly dependent, of course, on the particular alpha-hydroxyborinic acid reactant employed. While not desiring to be bound by theoretical considerations, it is believed that the alpha-hydroxyborinic acid reacts in accordance with the following equation:

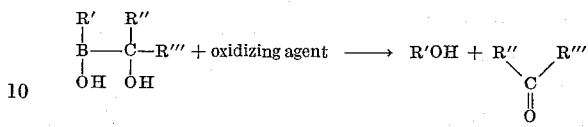

As noted from the above equation the alcohol product is derived from the R' hydrocarbon group bonded directly to the boron atom. Hence, the alcohol products produced by the process of this invention include methanol, ethanol, propanol, 2-propanol, 2-methyl propanol, butanol, pentanol, decanol, docosanol, cyclohexanol, benzyl alcohol, and the like.

As noted from the equation above, the ketone product produced is believed to be derived from the

which is bonded to the boron atom of the alpha-hydroxyborinic acid reactant. Hence, typical examples of ketone produced by the process of this invention are methyl ethyl ketone, methyl butyl ketone, ethyl methyl ketone, butyl methyl ketone, diethyl ketone, dimethyl ketone, dipentyl ketone, didecyl ketone, dicyclohexyl ketone, and the like.

The process of this invention has many advantageous features. One particularly advantageous feature is that the process of this invention enables one to produce alcohols and ketones which were heretofore extremely difficult to make or unobtainable. Still another advantage of this invention is that desirable, difficult to obtain ketones can be readily produced in good yields.

The process of this invention will be better understood by the following examples in which all parts are by weight unless otherwise specified.

EXAMPLE I

*Preparation of ethyl(3-hydroxy-3-pentyl) borinic acid*

A reaction vessel equipped with a means for agitation was charged with 50 parts of triethylborane and 50 parts of deaerated water. The vessel was then sealed and the agitation set into operation. While the contents of the vessel were continuously agitated, carbon monoxide was injected into the liquid mass within the reactor until a pressure of approximately 1,000 pounds per square inch was attained. After about 45 minutes, the pressure was noted to have dropped to 790 pounds per square inch, whereupon pressure in the reactor was adjusted upward to 1,350 pounds per square inch by the further addition of carbon monoxide. After an additional 45 minutes the pressure in the reactor was noted to have fallen to 1,230 pounds per square inch. Again, the pressure was adjusted upward, this time to 1,660 pounds per square inch. After about 30 minutes the pressure in the reactor was noted to be holding fairly constant at approximately 1,640 pounds per square inch. This indicated that the reaction was essentially complete, whereupon agitation was discontinued. The contents of the reactor were allowed to stand for a short period of time to phase separate into layers. The lower layer was found to be an aqueous layer and the upper layer was a clear liquid product. The clear liquid product was analyzed and found to be ethyl(3-hydroxy-3-pentyl) borinic acid.

*Preparation of 3-pentanone and ethanol*

The ethyl(3-hydroxy-3-pentyl) borinic acid was then reacted with an aqueous solution containing 30 parts of sodium hydroxide and 30 parts of hydrogen peroxide. This reaction mixture was stirred for a period of four hours at ambient temperatures. The products obtained, as indicated by chemical analysis, were 3-pentanone in a high yield and ethyl alcohol.

Similar excellent results are obtained when other oxidizing agents are employed, such as a mixture of nitrogen and oxygen, air, sodium peroxide, and the like.

EXAMPLE II

*Preparation of 3-methylpropyl(4-hydroxy-2,6-dimethyl-4-heptyl) borinic acid*

A reaction vessel was charged with 18 parts of triisobutylborane and 25 parts of deaerated water. The reactor was then sealed and a quantity of high pressure carbon monoxide sufficient to raise the pressure in the reactor to 2,100 pounds per square inch was injected into the reactor. After about 2 hours the pressure in the reactor leveled out to approximately 1,800 pounds per square inch. The reaction products were then removed from the reactor and found to comprise two liquid phases, the bottom phase containing a slush of a white solid. The upper phase was separated from the lower phase containing the white solid. Upon analysis, the upper phase was found to be 2-methylpropyl(4-hydroxy-2,6-dimethyl-4-heptyl) borinic acid (40 percent yield).

*Preparation of diisobutylketone and isobutyl alcohol*

The product was refluxed with an aqueous solution containing 30 percent hydrogen peroxide and 20 percent sodium hydroxide. Thirty parts of ethanol was added to the refluxing solution and refluxing was continued for an additional four hours. The reaction mixture was then diluted with water and the organic layer was analyzed by gas chromatography which indicated the products would be diisobutylketone and isobutyl alcohol in high yields.

EXAMPLE III

*Preparation of n-hexyl(7-hydroxy-7-tridecyl) borinic acid*

In this instance, the trihydrocarbonborane was prepared in situ by dissolving 10 parts of hexene-1 in 38 parts of dimethyl ether of diethylene glycol. This mixture was then hydroborated by adding 1 part of sodium borohydride followed by the addition of 6 parts of boron trifluoride etherate. The resulting mixture of tri-n-hexylborane and dimethyl ether of diethylene glycol was then charged into a reactor containing 50 parts of freshly deaerated water. The reactor was sealed and a quantity of high pressure carbon monoxide sufficient to produce a pressure of 2,000 pounds per square inch was injected into the liquid mass in the reactor, said mass being at room temperature. After approximately 6 hours it was noted that the pressure had leveled out to 1,800 pounds per square inch. This signified that the reaction was essentially complete. Upon allowing to stand, the contents of the reactor comprised two phases, the top layer being the desired product. The product, which had an oily appearance, was analyzed and found to be n-hexyl(7-hydroxy-7-tridecyl)borinic acid existing in essentially quantitative yield.

*Preparation of tridecanone-7 and n-hexyl alcohol*

The product so obtained was oxidized by treating it with an aqueous solution containing 30 percent hydrogen peroxide and 10 parts of aqueous sodium hydroxide at 15°–35° C. This reaction mass was permitted to react for a period of 3 hours. The products were extracted by ethers and subjected to gas chromatography analysis, which showed a high yield of tridecanone-7 and n-hexyl alcohol.

EXAMPLE IV

*Preparation of cyclohexyl(dicyclohexylhydroxymethyl)-borinic acid*

Ten parts of cyclohexene was dissolved in 38 parts of dimethyl ether of diethylene glycol. This mixture was then hydroborated by adding 1 part of sodium borohydride followed by the addition of 5 parts of boron trifluoride etherate. The resulting solution comprised tricyclohexylborane dissolved in dimethyl ether of diethylene glycol. The solution was then charged into a reaction vessel equipped with means for agitation and containing 50 parts of deaerated water. The reactor was sealed and the contents agitated. A quantity of carbon monoxide sufficient to produce a pressure within the reactor of 2,050 pounds per square inch was injected into the agitated contents of the reactor. After approximately 6 hours the pressure in the reactor was noted to have fallen to 1,700 pounds per square inch. Agitation was terminated and upon standing, the resultant mixture in the reactor separated into two separate phases. The upper phase was the desired end product and upon analysis was found to be cyclohexyl(dicyclohexylhydroxymethyl)borinic acid.

*Preparation of dicyclohexylketone and cyclohexyl alcohol*

The product cyclohexyl(dicyclohexylhydroxymethyl)-borinic acid is reacted with an aqueous solution containing 30 percent hydrogen peroxide and 10 parts of sodium hydroxide for a period of 4 hours at a temperature of about 50° C. The products so obtained are cyclohexyl alcohol and dicyclohexylketone in good yields as indicated by chemical analysis.

As noted in the examples above, the alpha-hydroxyborinic acid reactants employed in the process of this invention are generally produced by reacting a tri-hydrocarbon borane with carbon monoxide in the presence of water. This particular method of producing the alpha-hydroxyborinic acids is set forth in my copending application, Serial Number 207,056, filed July 2, 1962. Typical examples of the alpha-hydroxyborinic acids are:

methyl(2-hydroxy-2-propyl)borinic acid,
methyl(2-hydroxy-2-butyl)borinic acid,
methyl(2-hydroxy-3-methyl-2-butyl)borinic acid,
methl(3-hydroxy-3-pentyl)borinic acid,
methyl(3-hydroxy-3-hexyl)borinic acid,
methyl(2-hydroxy-2-hexyl)borinic acid,
methyl(2-hydroxy-4-methyl-2-pentyl)borinic acid,
methyl(2-hydroxy-3-methyl-2-pentyl)borinic acid,
methyl(2-hydroxy-3,3-dimethyl-2-butyl)borinic acid,
4-bromobutyl(2-hydroxy-2-propyl)borinic acid,
methoxymethyl(2-hydroxy-1-methoxy-2-propyl)borinic acid,
ethyl(2-hydroxy-2-butyl)borinic acid,
ethyl(2-hydroxy-2-pentyl)borinic acid,
ethyl(3-hydroxy-3-pentyl)borinic acid,
ethyl(3-hydroxy-3-hexyl)borinic acid,
propyl(2-hydroxy-2-propyl)borinic acid,
propyl(4-hydroxy-4-heptyl)borinic acid,
2-propyl-(3-hydroxy-2,4-dimethyl-3-pentyl)borinic acid,
2-methylpropyl-(4-hydroxy-2,6-dimethyl-4-heptyl)-borinic acid,
butyl(5-hydroxy-5-nonyl)borinic acid,
pentyl(2-hydroxy-2-butyl)borinic acid,
pentyl(6-hydroxy-6-hendecyl)borinic acid,
hexyl(7-hydroxy-7-tridecyl)borinic acid,
decyl(5-hydroxy-2-methyl-3-ethyl-5-decyl)borinic acid,
docosanyl(11-hydroxy-11-heneicosyl)borinic acid,
butenyl-(3-hydroxy-3-butyl)borinic acid,
cyclohexyl(dicyclohexylhydroxymethyl)borinic acid,
methyl(1-hydroxy-1-benzylethyl)borinic acid,
benzl(2-hydroxy-1,3-dibenzyl-2-propyl)borinic acid,
and the like.

The oxidizing agents employed in the process of this invention include air, hydrogen peroxide, a mixture of an inert gas and oxygen, oxygen, sodium peroxide, lithium peroxide, potassium peroxide, calcium peroxide, barium peroxide, magnesium peroxide, alkyl peroxydicarbonates such as diisopropyl peroxydicarbonate, diethyl peroxydicarbonate, alkyl peroxides such as isopropyl peroxide, lauryl peroxide and the like.

As stated hereinbefore, the process of this invention is generally conducted at a temperature range from about 0° C. up to about 200° C. However, it is preferred, in the process of this invention, to employ temperatures ranging from about 20° C. to about 150° C. since, within this range, excellent results are obtained in that alcohols and ketones of high purity are realized. The reaction time required in the process of this invention can generally vary over a wide range. Times ranging from about five minutes up to about 30 hours are generally sufficient. However, it is preferred, from a standpoint of economics, to employ reaction times ranging from about 30 minutes to about 10 hours.

In some instances when a gaseous type oxidizing agent is employed, it is desirable to pressurize the system; hence pressures ranging from about sub-atmospheric up to about 20 atmospheres may be employed in these instances. It is preferable, however, to employ pressures ranging from about atmospheric up to about 10 atmospheres, since excellent results are obtained within this range.

In some instances it is desirable, but not necessary, to employ an inert diluent in the process of this invention. Typical diluents which could be employed are paraffins, aromatic hydrocarbons, mixtures of paraffins, ethers, and the like. Typical examples of these diluents include pentane, hexane, nonane, decane, benzene, toluene, xylene, gasoline, kerosene, diethyl ether, the dimethyl ether of diethylene glycol, the dimethyl ether of triethylene glycol, and the like.

Having thus described this unique invention and its embodiments, it is not intended that it be limited except as set forth in the following claims.

I claim:

1. A process for producing alcohols and ketones which comprises reacting, (1) an alpha-hydroxyborinic acid having the formula

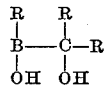

wherein the R groups are the same or different hydrocarbon radicals each containing up to about 18 carbon atoms, with (2) an oxidizing agent selected from the group consisting of molecular oxygen containing gas, inorganic peroxide, alkyl peroxide, and alkyl peroxy dicarbonate, said process being conducted in an aqueous system having a pH of above about 8, at a temperature ranging from about 0° C. to about 200° C., for a time sufficient to produce alcohols and ketones.

2. The process of claim 1 wherein said alpha-hydroxyborinic acid is further characterized in that the R groups of said acid are identical.

3. The process of claim 1 further characterized in that the R groups of said alpha-hydroxyborinic acid are alkyl groups.

4. The process of claim 1 wherein said alpha-hydroxyborinic acid is ethyl(3-hydroxy-3-pentyl) borinic acid.

5. The process of claim 1 wherein said alpha-hydroxyborinic acid is 2-methylpropyl(4-hydroxy-2,6-dimethyl-4-heptyl) borinic acid.

6. The process of claim 1 wherein said oxidizing agent is hydrogen peroxide.

References Cited by the Examiner

Hillman: "J. Am. Chem. Soc.," vol. 84, pp. 4715–20 (1962).

Hillman: "J. Am. Chem. Soc.," vol. 85, pp. 982–4 (1963).

LEON ZITVER, *Primary Examiner.*

DANIEL D. HORWITZ, *Examiner.*

M. JACOB, *Assistant Examiner.*